United States Patent
Stola et al.

(10) Patent No.: US 10,739,232 B2
(45) Date of Patent: Aug. 11, 2020

(54) METHOD OF ESTIMATING THE MFB50 COMBUSTION INDEX AND THE INSTANTANEOUS TORQUE GENERATED BY THE CYLINDERS OF AN INTERNAL COMBUSTION ENGINE

(71) Applicant: MAGNETI MARELLI S.p.A., Corbetta (IT)

(72) Inventors: Federico Stola, Bologna (IT); Matteo De Cesare, Torremaggiore (IT); Fabrizio Ponti, Forli' (IT); Vittorio Ravaglioli, Forli' (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 192 days.

(21) Appl. No.: 15/341,156

(22) Filed: Nov. 2, 2016

(65) Prior Publication Data
US 2017/0122839 A1    May 4, 2017

(30) Foreign Application Priority Data
Nov. 3, 2015   (IT) .................. 102015000068409

(51) Int. Cl.
*G01M 15/06*   (2006.01)
*G01L 3/10*    (2006.01)
(Continued)

(52) U.S. Cl.
CPC .......... *G01M 15/06* (2013.01); *F02D 35/028* (2013.01); *F02D 41/009* (2013.01);
(Continued)

(58) Field of Classification Search
CPC .... G01M 15/06; F02D 35/028; F02D 41/009; F02D 41/1497; F02D 35/023;
(Continued)

(56) References Cited

U.S. PATENT DOCUMENTS 4,899,596 A * 2/1990 Janik et al. ................. 73/862.33
5,038,616 A * 8/1991 Schneider ............. G01H 1/003
702/43
(Continued)

FOREIGN PATENT DOCUMENTS

DE          19941683 A1 * 3/2001
DE     102006056708 A1    6/2008
(Continued)

OTHER PUBLICATIONS

Ponti (F. Ponti and et al, "MFB50 on-board estimation methodology for combustion control", Control Engineering Practice, vol. 21, No. 12. pp. 1821-1829, Dec. 2013).*
(Continued)

*Primary Examiner* — Alexander Satanovsky
*Assistant Examiner* — Douglas Kay
(74) *Attorney, Agent, or Firm* — Howard & Howard Attorneys PLLC

(57) ABSTRACT

A method of estimating the MFB50 combustion index of the cylinders of an internal combustion engine provided with a drive shaft coupled to at least a pair of position sensors, each of which is arranged at a respective end of the drive shaft; the estimation method comprising the steps of: acquiring the signals coming from two position sensors; determining the angular torsion of the drive shaft based on the signals from the two position sensors; and estimating the MFB50 combustion index of the single cylinders of the internal combustion engine based on the angular torsion of the drive shaft.

5 Claims, 6 Drawing Sheets

(51) Int. Cl.
  *F02D 35/02* (2006.01)
  *F02D 41/14* (2006.01)
  *F02D 41/00* (2006.01)
  *G01B 21/22* (2006.01)
  *F02D 41/28* (2006.01)

(52) U.S. Cl.
  CPC ......... *F02D 41/1497* (2013.01); *G01B 21/22* (2013.01); *G01L 3/109* (2013.01); *F02D 35/023* (2013.01); *F02D 41/008* (2013.01); *F02D 2041/288* (2013.01); *F02D 2200/1004* (2013.01); *F02D 2400/08* (2013.01)

(58) Field of Classification Search
  CPC ............. F02D 41/008; F02D 2041/288; F02D 2200/1004; F02D 2400/08; G01B 21/22; G01L 3/109
  USPC .......................................................... 702/151
  See application file for complete search history.

(56) References Cited

U.S. PATENT DOCUMENTS

| | | | |
|---|---|---|---|
| 5,605,132 A * | 2/1997 | Hori | F02D 41/1498 123/406.24 |
| 5,816,218 A * | 10/1998 | Motose | F02B 61/045 123/406.18 |
| 5,979,248 A | 11/1999 | Gloger | |
| 6,745,621 B1 * | 6/2004 | Le Roux Cilliers et al. | 73/117.3 |
| 7,006,913 B2 * | 2/2006 | Sgatti | G01M 15/046 701/111 |
| 7,093,504 B2 * | 8/2006 | Southward | 73/862.08 |
| 7,988,243 B2 * | 8/2011 | Miyazaki | B60T 17/22 303/155 |
| 8,688,358 B2 * | 4/2014 | Sano | F02D 35/023 123/435 |
| 2005/0044968 A1 * | 3/2005 | Southward | 73/862.324 |
| 2005/0096834 A1 * | 5/2005 | Sgatti | G01M 15/046 701/111 |
| 2008/0148826 A1 | 6/2008 | Raichle et al. | |
| 2009/0095060 A1 * | 4/2009 | Serra et al. | 73/114.26 |
| 2010/0031756 A1 * | 2/2010 | Mian | G01L 3/109 73/862.335 |
| 2015/0120122 A1 * | 4/2015 | Sakakibara | B60W 20/10 701/22 |
| 2015/0204231 A1 * | 7/2015 | Dellora | F02M 35/10236 60/605.1 |
| 2015/0377156 A1 * | 12/2015 | Hagari | F02D 41/0007 60/602 |
| 2017/0051700 A1 * | 2/2017 | Fulton | F02D 41/1497 |

FOREIGN PATENT DOCUMENTS

| | | |
|---|---|---|
| DE | 102011085268 A1 | 5/2013 |
| EP | 0762101 A1 | 3/1997 |
| EP | 2022967 A1 | 2/2009 |
| WO | 9620395 A1 | 7/1996 |
| WO | 0125738 A1 | 4/2001 |

OTHER PUBLICATIONS

Italian Search Report dated Jul. 13, 2016 for Italian Patent Application No. UB20154998.

Communication and Extended European Search Report dated Apr. 25, 2017 by the European Patent Office for European Patent Application No. 16196629.6.

Ponti, F., et al., "Development of a Methodology for Engine Performance Investigation Through Double Crankshaft Speed Measurement," Proceedings of the ASME 2015 Internal Combustion Engine Division Fall Technical Conference, Nov. 8-11, 2015, vol. 2: Emissions Control Systems; Instrumentation, Controls, and Hybrids; Numerical Simulation; Engine Design and Mechanical Development, pp. 1-8.

Ponti, Fabrizio, et al., "MFB50 on-board estimation methodology for combustion control," Control Engineering Practice, vol. 21, No. 12, pp. 1821-1829 (Dec. 2013) (available online May 24, 2013).

* cited by examiner

METHOD OF ESTIMATING THE MFB50 COMBUSTION INDEX AND THE INSTANTANEOUS TORQUE GENERATED BY THE CYLINDERS OF AN INTERNAL COMBUSTION ENGINE

TECHNICAL FIELD

The present invention concerns a method of estimating the MFB50 combustion index and the instantaneous torque generated by the cylinders of a drive shaft of an internal combustion engine.

PRIOR ART

Internal combustion engines with controlled mixture ignition (i.e. the internal combustion engines operating according to the "Otto" cycle and fed with gasoline, methane, EPL or the like) have been using for many years the MFB50 combustion index as a control magnitude. In an internal combustion engine with controlled mixture ignition, the starting instant of combustion (based on the sparking instant of the ignition spark) is certainly and accurately known and is chosen beforehand by the engine control strategy by means of the spark advance control, thus relatively simplifying the estimation of the MFB50 combustion index.

Instead, in internal combustion engines with spontaneous mixture ignition (i.e. in the internal combustion engines operating according to the "Diesel" cycle and fed with oil or the like), the MFB50 combustion index is not used as a control magnitude, due to the considerable difficulties in estimating such MFB50 combustion index efficiently (i.e. with sufficient accuracy), effectively (i.e. rapidly and without employing an excessive computing power) and cost-effectively (i.e. without requiring the installation of additional components beside those normally present).

Currently, the MFB50 combustion index is determined by using pressure sensors overlooking the combustion chamber, which can directly measure the pressure within the cylinder; however, such pressure sensors are extremely expensive and have a limited reliability in time, and are therefore unsuitable for an extensive use in series-produced vehicles.

To solve the aforesaid drawbacks, the patent application EP2022967A1 has proposed a method of estimating the MFB50 combustion index and the torque generated in a cylinder of an internal combustion engine with spontaneous mixture ignition provided with a drive shaft coupled to a phonic wheel having several teeth. The estimation method comprises the steps of: reading the passage of each tooth of the phonic wheel in front of a sensor;
determining the angular speed of the drive shaft at each tooth event of the phonic wheel;
determining, by means of a frequency analysis of the angular speed of the drive shaft, at least one harmonic of the speed signal characterized by its own module and by its own phase;
determining an inverse mechanical model of the transmission which represents, in the frequency domain, the relation between the Fourier transforms of the angular speed and the internal combustion engine torque;
determining at least one torque harmonic, characterized by its own module and by its own phase, by applying the inverse mechanical model of the transmission to the harmonic of the speed signal;
determining a first algebraic function which puts the MFB50 combustion index into relation with the phase of the n-th torque harmonic and a second algebraic function which puts the indicated torque into relation with the module of the n-th torque harmonic; and
determining the MFB50 combustion index by applying the first algebraic function to n-th torque harmonic and determining the indicated torque by applying the second algebraic function to the n-th torque harmonic.

The estimation method described in the patent application EP2022967A1 is efficient (i.e. it allows the estimation of the MFB50 combustion index and of the indicated torque with remarkable accuracy), effective (i.e. it allows the estimation of the MFB50 combustion index and of the indicated torque rapidly without employing an excessive computing power) and cost-effective (i.e. it does not require the installation of additional components beside those normally present in a modern internal combustion engine operating according to the "Diesel" cycle).

However, the estimation method described in the patent application EP2022967A1 has the disadvantage of using a relatively complex inverse mechanical transmission model, which must also take into account the inertial torque due to the masses in reciprocating movement (i.e. the masses of the pistons) to provide an accurate estimation. Considering the inertial torques requires knowledge of various engine parameters and results in a considerable increase in required computing power and in calibration tests necessary to the model definition.

DESCRIPTION OF INVENTION

It is the object of the present invention to provide a method of estimating the MFB50 combustion index and the instantaneous torque generated by the cylinders of a drive shaft of an internal combustion engine, said method being free from the drawbacks described above.

According to the present invention it is provided a method of estimating the MFB50 combustion index and the instantaneous torque generated by the cylinders of a drive shaft of an internal combustion engine, as claimed by the appended claims.

BRIEF DESCRIPTION OF THE DRAWINGS

The present invention will now be described with reference to the accompanying drawings, which show a non-limiting embodiment, in which.

PREFERRED EMBODIMENTS OF THE INVENTION

Figure 1:
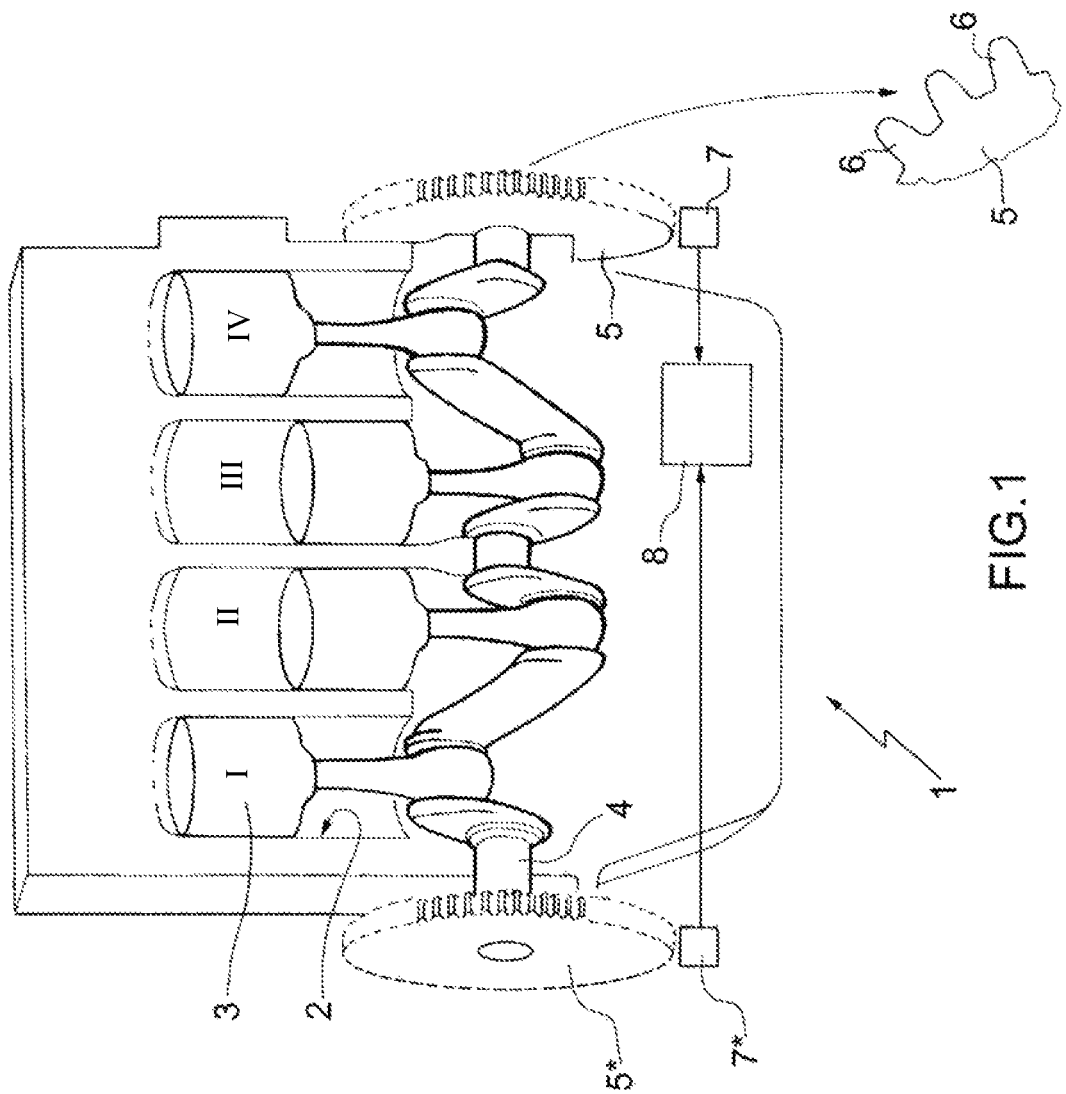
FIG. 1 is a schematic view of a first embodiment of an internal combustion engine provided with a control unit that implements the estimation method of the present invention.

In FIG. 1, numeral 1 indicates as a whole an internal combustion engine mounted on a road vehicle, which is provided with a transmission line to transmit to the ground the torque generated by the combustion engine 1. The internal combustion engine 1 comprises four cylinders 2 (indicated by I, II, III, IV), each of which houses a respective piston 3, mechanically connected by means of a connecting rod to a drive shaft 4 for transmitting to the drive shaft 4 the force generated by the combustion within the cylinder 2.

Two phonic wheels 5, 5\* are keyed to the drive shaft 4. Each phonic wheel 5, 5\* is keyed to one end of the drive shaft 4; the phonic wheel 5 is keyed to the end of the drive shaft 4 at the flywheel, and the phonic wheel 5\* is keyed to the end of the drive shaft 4 at the timing belt. Each phonic wheel 5, 5\* is provided with a number n (for example 60) of teeth 6 (equal for the two phonic wheels 5, 5\*) and is coupled to a respective sensor 7, 7\*, which detects the time elapsed between the passage of two consecutive teeth 6. The teeth 6 of each phonic wheel 5, 5\* are equally spaced out, with the exception of one pair of teeth 6 which are reciprocally arranged at a greater distance than the others to constitute a singularity which allows an accurate identification of each tooth 6 and thus of the angular position of each phonic wheel 5, 5\* (i.e. of the drive shaft 4). Moreover, the engine 1 comprises a control unit 8 connected to the sensors 7, 7\*.

It is described hereinafter the mode used by the control unit 8 to estimate in use the actual instantaneous torque $T_{i\_real}$ provided by each cylinder 2 using the information provided by the sensors 7, 7\* coupled to respective phonic wheels 5, 5\*. Each sensor 7, 7\* detects a series of variables, including:

duration $T_i$ of the n-th tooth 6 of each phonic wheel 5, 5\*, i.e. the time elapsed between the detections of the two angular events characterizing the current tooth 6;

angular raw speed $\omega_{raw,1}$ of the current tooth 6;

drive angle α (i.e. the angular position of the drive shaft 4 that is comprised between 0 and 4n radians); and time instant $T_5$, $T_{5*}$ in which the passage of the n-th tooth 6 of each phonic wheel 5, 5\* is detected by the respective sensor 7, 7\*.

In particular, the instantaneous angular speed $\omega_5$ of the n-th tooth 6 of the phonic wheel 5 is given by the following equation:

$$\omega_5 = \Delta\alpha_i / T_i \quad [1]$$

$\omega_5$ angular speed of the n-th tooth 6 of the phonic wheel 5 [rad/s];

$\Delta\alpha_i$ angular amplitude of the n-th tooth 6 of the phonic wheel 5 [rad];

$T_i$ duration of the n-th tooth 6 of the phonic wheel 5 [s].

Figure 2:
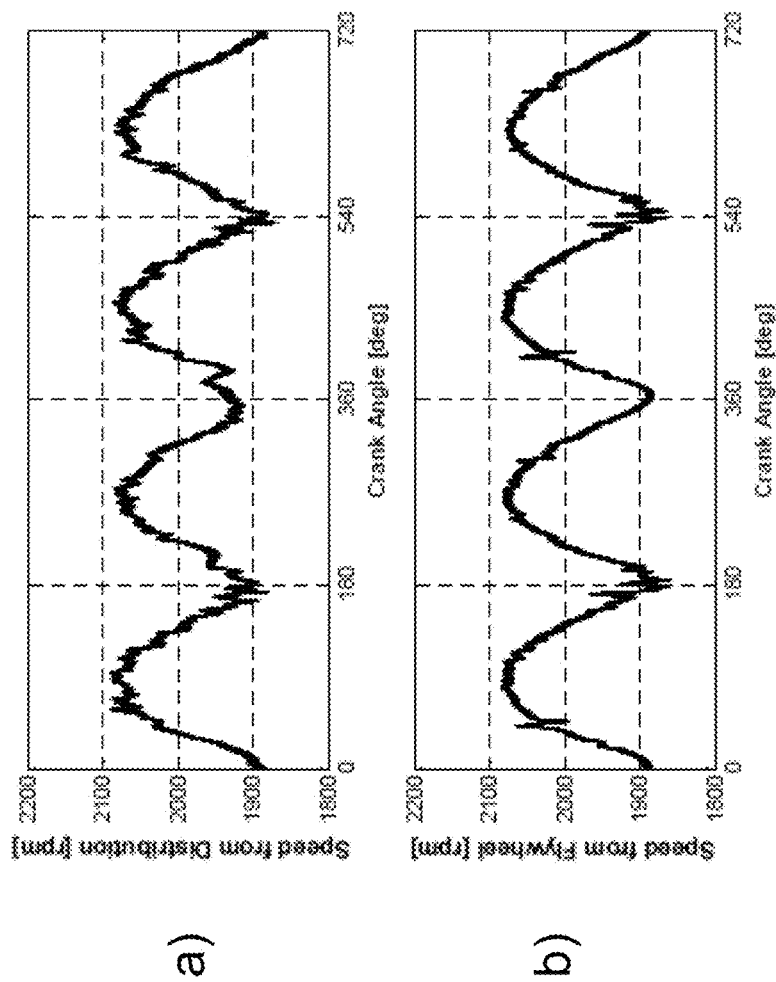
FIG. 2 shows the trend of the instantaneous angular speed detected by two position sensors of FIG. 1.

The trend of the instantaneous angular speed $\omega_5$ of the n-th tooth 6 of the phonic wheel 5 is shown in FIG. 2b for a drive point at 2000 rpm of instantaneous angular speed ω and based on the drive angle.

Similarly, the instantaneous angular speed $\omega_{5*}$ of the n-th tooth 6 of the phonic wheel 5\* is given by the following equation:

$$\omega_{5*} = \Delta\alpha_i / T_i \quad [2]$$

$\omega_{5*}$ angular speed of the n-th tooth 6 of the phonic wheel 5\* [rad/s];

$\Delta\alpha_i$ angular amplitude of the n-th tooth 6 of the phonic wheel 5\* [rad];

$T_i$ duration of the n-th tooth 6 of the phonic wheel 5\* [s].

The trend of the instantaneous angular speed $\omega_{5*}$ of the n-th tooth 6 of the phonic wheel 5\* is shown in FIG. 2a for a drive point at 2000 rpm of instantaneous angular speed $\omega_{5*}$ and based on the drive angle.

The above listed values detected by the sensor 7 are transmitted to the control unit 8. In a preliminary set-up phase, a corresponding angular reference (i.e. a corresponding n-th tooth 6 of the phonic wheel 5\*) of the phonic wheel 5\* is associated with each angular reference (i.e. each n-th tooth 6 of the phonic wheel 5) of the phonic wheel 5.

The trend of the instantaneous angular speed $\omega_{5*}$ of the n-th tooth 6 of the phonic wheel 5\* shown in FIG. 2a is similar to the trend of the instantaneous angular speed $\omega_{5*}$ of the n-th tooth 6 of the phonic wheel 5. Therefore, this can be simplified by taking into account an angular speed ω of the n-th tooth 6 calculated through the instantaneous angular speed $\omega_5$ or through the instantaneous angular speed $\omega_{5*}$.

The control unit 8 can then calculate the instantaneous relative torsion Δθ through the following formula:

$$\Delta\theta = \omega_*(T_5 - T_{5*}) \quad [3]$$

ω average angular speed of the n-th tooth 6 of the phonic wheel 5 [rad/s];

Δθ instantaneous relative torsion [rad];

$T_5$ time instant when the passage of the n-th tooth 6 of the phonic wheel 5 is detected by the respective sensor 7 [s]; and $T_{5*}$ time instant when the passage of the n-th tooth 6 of the phonic wheel 5\* is detected by the respective sensor 7\* [s].

Figure 3:
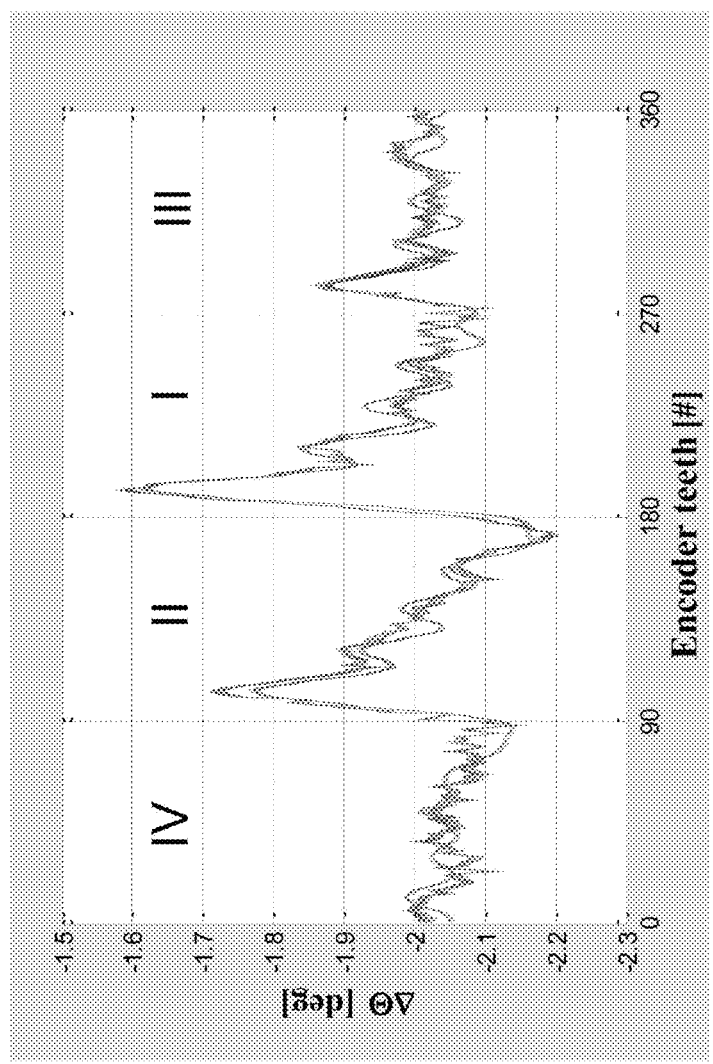
FIG. 3 shows the trend of the instantaneous relative torsion of the drive shaft of FIG. 1 for a drive point at 2000 rpm of average instantaneous angular speed.

The trend of the instantaneous relative torsion Δθ calculated through the formula [3] is shown in FIG. 3 based on the teeth 6 of the phonic wheel 5 for a drive point at 2000 rpm of average instantaneous angular speed ω. Please note how the instantaneous relative torsion Δθ is variable based on the distance of the cylinders 2 from the torque application point, i.e. from the flywheel (not shown); in other words, the instantaneous relative torsion Δθ is a maximum for the cylinder I, namely the furthest from the flywheel, and is a minimum for the cylinder IV, namely the closest to the flywheel.

In a preliminary set-up phase of the engine, which typically occurs during the engine bench development, the average torque values $T_i$ produced by each cylinder 2 are measured during the combustion phase through the pressure sensors, which directly measure the pressure within the combustion chamber of each cylinder 2.

Once measured the average torque values $T_i$ produced by each cylinder 2, a correlation coefficient $K_i$ between the average torque $T_i$ produced during the combustion and the average torsion $\Delta\theta_i$ of the considered cylinder 2 can be determined for each cylinder 2. The relation can be expressed as follows:

$$K_i = T_i / \Delta\theta i \text{ with } i = 1 \ldots n \quad [4]$$

$\Delta\theta_i$ average torsion based on the cylinder 2;

$T_i$ average torque based on the cylinder 2;

$K_i$ correlation coefficient between the average torque $T_i$ produced during the combustion and the average torsion Δθ based on the cylinder 2; and n number of cylinders 2.

Please note that the average torsion $\Delta\theta_i$ of the considered cylinder 2 is used to determine the correlation coefficient $K_i$ of each cylinder 2; it is thus possible to determine for each cylinder a correlation between the average torque $T_i$ and the average torsion $\Delta\theta_i$ produced during the combustion along the angular arc corresponding to the combustion phase. In particular, the correlation between the average torque $T_i$ and the average torsion $\Delta\theta_i$ produced during the combustion along the angular arc corresponding to the combustion phase of each cylinder 2 is substantially linear.

Figure 4:
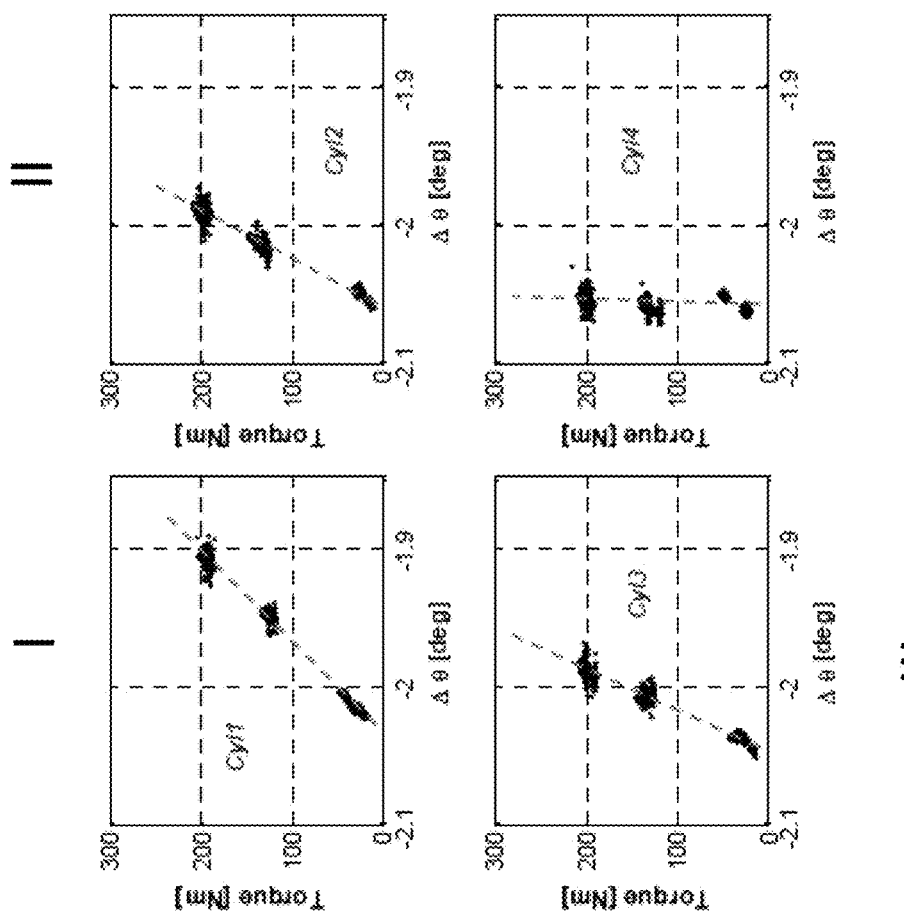
FIG. 4 shows the correlation between the average torsion of the drive shaft of FIG. 1 and the torque generated during the combustion for each cylinder of FIG. 1.

FIG. 4 shows the correlation between the average torque $T_i$ and the average torsion $\Delta\theta_i$ produced during the combustion for each cylinder 2. Clearly, it is possible to note how the correlation coefficient $K_i$ of the cylinders 2 is variable based on the distance of the cylinders 2 from the torque application point, i.e. from the flywheel (not shown).

Once determined the correlation coefficients $K_i$ for each cylinder 2, these correlation coefficients $K_i$ may be used during the normal operation of the internal combustion engine 1 to determine the actual instantaneous torque $T_{i\_real}$ provided by each cylinder 2.

In particular, the actual instantaneous torque $T_{i\_real}$ provided by each cylinder 2 can be calculated as follows:

$$T_{i\_real} = K_i * \Delta\theta_{av\_i} \text{ with } i=1 \ldots n \quad [5]$$

$\Delta\theta_{av\_i}$ average relative torsion for each cylinder 2 calculated through the formula [3];

$T_{i\_real}$ actual instantaneous torque provided by each cylinder 2;

$K_i$ correlation coefficient between the average torque $T_i$ produced during the combustion and the average relative torsion $\Delta\theta$ for each cylinder 2 calculated through the formula [3]; and n number of cylinders 2.

It is described hereinafter the mode used by the control unit 8 for estimating the MFB50 combustion index in each cylinder 2 using the information provided by the sensors 7, 7* coupled to respective phonic wheels 5, 5*. The combustion index MFB50 (50% Mass Fraction Burnt) is the drive angle (i.e. the crank angle) at which 50% of the fuel mass has been burnt in the cylinder 2.

First, a frequency analysis of the trend of the instantaneous relative torsion $\Delta\theta$ is carried out, calculated through the formula [3] and shown in FIG. 3 based on the teeth 6 of the phonic wheel 5 for a drive point at 2000 rpm of average instantaneous angular speed $\omega$. In particular, a Fourier analysis is carried out by applying the Fourier transform to the instantaneous relative torsion $\Delta\theta$ along the angular arc corresponding to the combustion phase of each cylinder 2. It is thus possible to determine a plurality of harmonics $\Omega_n$ of the instantaneous relative torsion $\Delta\theta$.

The nth harmonic $\Omega_n$ of the instantaneous relative torsion $\Delta\theta$ is a complex number, characterized by its own module $|\Omega_n|$ and by its own phase Arg $(\Omega_n)$. The considered harmonic depends on the number of cylinders 2 of the internal combustion engine 1 and on the type of desired estimation. More in detail, it has been experimentally verified that the harmonic $\Omega_1$ of the instantaneous relative torsion $\Delta\theta$ characterizing the combustion process and significant in the determination of the MFB50 combustion index is the first harmonic calculated on the angular range corresponding to the combustion phase, characterized by its own module $|\Omega_1|$ and by its own phase Arg $(\Omega_1)$.

In particular, it has been experimentally verified that the MFB50 combustion index is related to the phase Arg $(\Omega_1)$ of the harmonic $\Omega_1$ of the instantaneous relative torsion $\Delta\theta$.

In a preliminary set-up phase of the engine, which typically occurs during the engine bench development, the MFB50 combustion index values are measured for each cylinder 2 by means of the pressure sensors that directly measure the pressure within the combustion chamber 2 of each cylinder.

Once measured the values of the MFB50 combustion index for each cylinder 2, a correlation coefficient $P_i$ between the MFB50 combustion index of the cylinder 2 and the phase Arg $(\Omega_1)$ of the harmonic $\Omega_1$ of the instantaneous relative torsion $\Delta\theta$ can be determined for each cylinder 2. The relation can be expressed as follows:

$$P_i = \text{MFB50}_i / \text{Arg}(\Omega_1)_i \text{ with } i=1 \ldots n \quad [6]$$

$\text{MFB50}_i$ MFB50 combustion index based on the cylinder 2;

Arg $(\Omega_1)_1$ phase Arg $(\Omega_1)$ of the harmonic $\Omega_1$ of the instantaneous relative torsion $\Delta\theta$ based on the cylinder 2;

$P_i$ correlation coefficient between the MFB50 combustion index and the phase Arg $(\Omega_1)$ of the harmonic $\Omega_1$ of the instantaneous relative torsion $\Delta\theta$ for each cylinder 2; and n number of cylinders 2.

Please note that the phase Arg $(\Omega_1)$ of the harmonic $\Omega_1$ of the instantaneous relative torsion $\Delta\theta$ of the considered cylinder 2 is used to determine the correlation coefficient $P_i$ of each cylinder 2; it is thus possible to determine for each cylinder 2 a correlation between the MFB50 combustion index and the phase Arg $(\Omega_1)$ of the harmonic $\Omega_1$ of the instantaneous relative torsion $\Delta\theta$ during the combustion along the angular arc corresponding to the combustion phase. In particular, the correlation between the MFB50 combustion index and the phase Arg $(\Omega_1)$ of the harmonic $\Omega_1$ of the instantaneous relative torsion $\Delta\theta$ during the combustion along the angular arc corresponding to the angular phase of combustion of each cylinder 2 is substantially linear.

Figure 5:
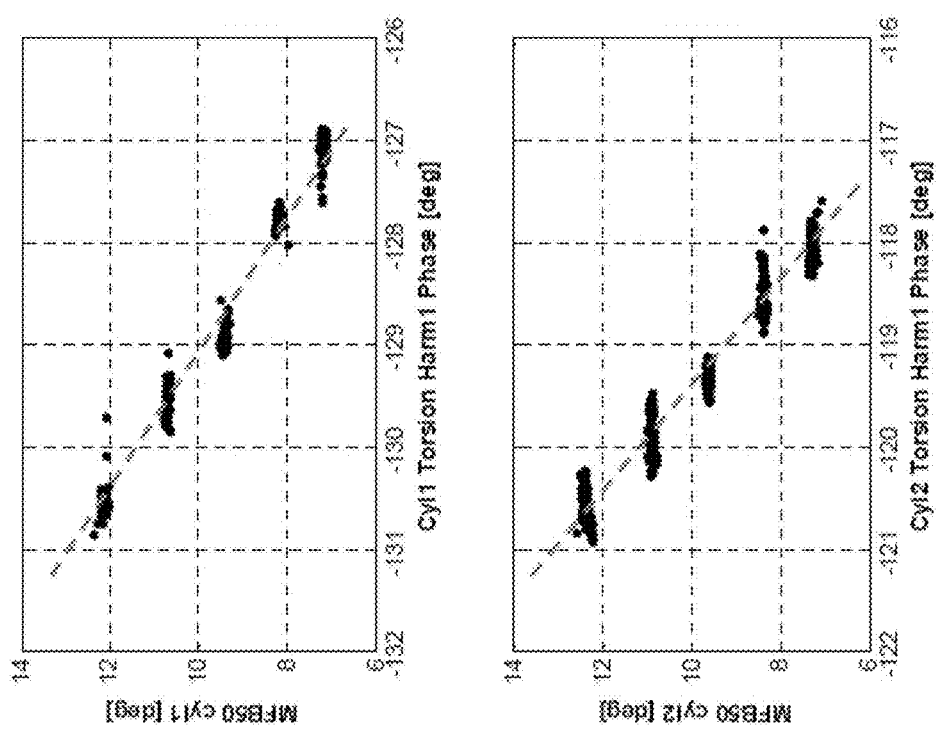
FIG. 5 shows the correlation between the average torsion of the drive shaft of FIG. 1 and the MFB50 combustion index for each cylinder of FIG. 1.

FIG. 5 shows the correlation between the MFB50 combustion index and the phase Arg $(\Omega_1)$ of the harmonic $\Omega_1$ of the instantaneous relative torsion $\Delta\theta$ during the combustion for each cylinder 2. Clearly, it is possible to note how the correlation coefficient $P_i$ of the cylinders 2 is variable based on the distance of the cylinders 2 from the torque application point, i.e. from the flywheel (not shown).

Once determined the correlation coefficients $P_i$ for each cylinder 2, these correlation coefficients $P_i$ can be used during the normal operation of the internal combustion engine 1 to determine the actual $\text{MFB50}_{real}$ combustion index for each cylinder 2.

In particular, the actual $\text{MFB50}_{real}$ combustion index for each cylinder 2 can be calculated as follows:

$$\text{MFB50}_{i\_real} = P_i * \text{Arg}(\Omega_1)_i \text{ with } i=1 \ldots n \quad [7]$$

$\text{MFB50}_{i\_real}$ actual combustion index based on the cylinder 2;

Arg $(\Omega_1)$ phase Arg $(\Omega_1)$ of the harmonic $\Omega_1$ of the instantaneous relative torsion $\Delta\theta$ based on the cylinder 2;

$P_i$ correlation coefficient between the MFB50 combustion index and the phase Arg $(\Omega_1)$ of the harmonic $\Omega_1$ of the instantaneous relative torsion $\Delta\theta$ for each cylinder 2; and n number of cylinders 2.

The methods of estimating the actual $\text{MFB50}_{real}$ combustion index for each cylinder 2 and the actual instantaneous torque $T_{i\_real}$ provided by each cylinder 2 so far described can be implemented with any angular position transducer or position sensor alternative to the two phonic wheels 5, 5*. For example, it is possible to use two encoders arranged at the respective ends of the drive shaft 4.

The aforesaid estimation methods of the actual $\text{MFB50}_{real}$ combustion index for each cylinder 2 and of the actual instantaneous torque $T_{i\_real}$ provided by each cylinder 2 may find advantageous application with any number of position sensors. According to a possible variant (not shown), the internal combustion engine 1 comprises a plurality of phonic wheels 5, among which a pair of phonic wheels 5 keyed to respective ends of the drive shaft 4 and the remaining phonic wheels keyed to the drive shaft and interposed between two adjacent cylinders 2. In particular, according to a possible variant (not shown), five phonic wheels 5 are keyed to the drive shaft 4. The internal combustion engine 1 comprises two end phonic wheels 5 keyed to the respective ends of the drive shaft 4 (i.e. a first end phonic wheel 5 keyed to the end of the drive shaft 4 at the flywheel and a second end phonic wheel 5 keyed to the end of the drive shaft 4 at the timing belt) and three intermediate phonic wheels 5. A first intermediate phonic wheel 5 is interposed between the cylinder 2 indicated by I and the cylinder 2 indicated by II; a second intermediate phonic wheel 5 is interposed between the cylinder 2 indicated by II and the cylinder 2 indicated by III; and finally, a third intermediate phonic wheel 5 is interposed between the cylinder 2 indicated by III and the cylinder 2 indicated by IV. The five phonic wheels 5 are provided with the same number n (for example 60) of teeth 6 and are coupled to respective sensors 7, adapted to detect the time elapsed between the passage of two consecutive teeth 6. The control unit 8 can then calculate the relative instantaneous relative torsion $\Delta\theta i$ for each cylinder 2 through the following formula:

$$\Delta\theta i = \omega*(T'-T'') \text{ with } i=1\ldots n \quad [8]$$

$\omega$ average angular speed of the n-th tooth 6 [rad/s] calculated through the formula [1] or [2];

$\Delta\theta_i$ instantaneous relative torsion of the considered cylinder 2 [rad];

T',T" time instants when the passage of the n-th tooth 6 is detected by the sensors 7 overlooking the two phonic wheels 5 adjacent to the considered cylinder 2 [s]; and n number of cylinders 2.

With regard to the cylinder 2 indicated by I, the determination of the instantaneous relative torsion $\Delta\theta$ involves the second end phonic wheel 5 keyed to the end of the drive shaft 4 at the timing belt and the first intermediate phonic wheel 5 interposed between the cylinder 2 indicated by I and the cylinder 2 indicated by II; with regard to the cylinder 2 indicated by II, the determination of the instantaneous relative torsion $\Delta\theta$ involves the first intermediate phonic wheel 5 interposed between the cylinder 2 indicated by I and the cylinder 2 indicated by II, and the second intermediate phonic wheel 5 interposed between the cylinder 2 indicated by II and the cylinder 2 indicated by III; with regard to the cylinder 2 indicated by III, the determination of the instantaneous relative torsion $\Delta\theta$ involves the second intermediate phonic wheel 5 interposed between the cylinder 2 indicated by II and the cylinder 2 indicated by III and the third intermediate phonic wheel 5 interposed between the cylinder 2 indicated by III and the cylinder 2 indicated by IV; finally, with regard to the cylinder 2 indicated by IV, the determination of the instantaneous relative torsion $\Delta\theta$ involves the third intermediate phonic wheel 5 interposed between the cylinder 2 indicated by III and the cylinder 2 indicated by IV and the first end phonic wheel 5 keyed to the end of the drive shaft 4 at the flywheel.

Once determined the correlation coefficients $K_i$ for each cylinder 2, as described in the discussion above, these correlation coefficients $K_i$ can be used during the normal operation of the internal combustion engine 1 to determine the actual instantaneous torque $T_{i\_real}$ provided by each cylinder 2.

In particular, the actual instantaneous torque $T_{i\_real}$ provided by each cylinder 2 can be calculated as follows:

$$T_{i\_real} = Ki*\omega*(T'-T'') \text{ with } i=1\ldots n \quad [9]$$

$T_{i\_real}$ actual instantaneous torque provided by the considered cylinder 2;

$K_i$ correlation coefficient between the average torque $T_i$ produced during the combustion and the instantaneous relative torsion of the considered cylinder 2;

$\omega$ average angular speed of the n-th tooth 6 [rad/s] calculated through the formula [1] or [2];

T', T" time instants when the passage of the n-th tooth 6 is detected by the sensors 7 overlooking the two phonic wheels 5 adjacent to the considered cylinder 2 [s]; and n number of cylinders 2.

Analogously, once determined the correlation coefficients $P_i$ for each cylinder 2 as previously described, these correlation coefficients $P_i$ can be used during the normal operation of the internal combustion engine 1 for determining the actual $MFB50_{i\_real}$ combustion index for each cylinder 2 by means of the relative instantaneous torsion $\Delta\theta_i$ for each cylinder 2 calculated through the formula [8].

The aforesaid estimation method can be used in an internal combustion engine 15 devoid of pressure sensors that directly measure the pressure within the cylinders 2 for estimating the MFB50 combustion index and the actual instantaneous torque $T_{i\_real}$ provided by each cylinder 2.

Alternatively, the method of estimating the MFB50 combustion index and the actual instantaneous torque $T_{i\_real}$ provided by each cylinder 2 can find advantageous application in an internal combustion engine provided with pressure sensors 15 that directly measure the pressure within the cylinders 2.

Figure 6:
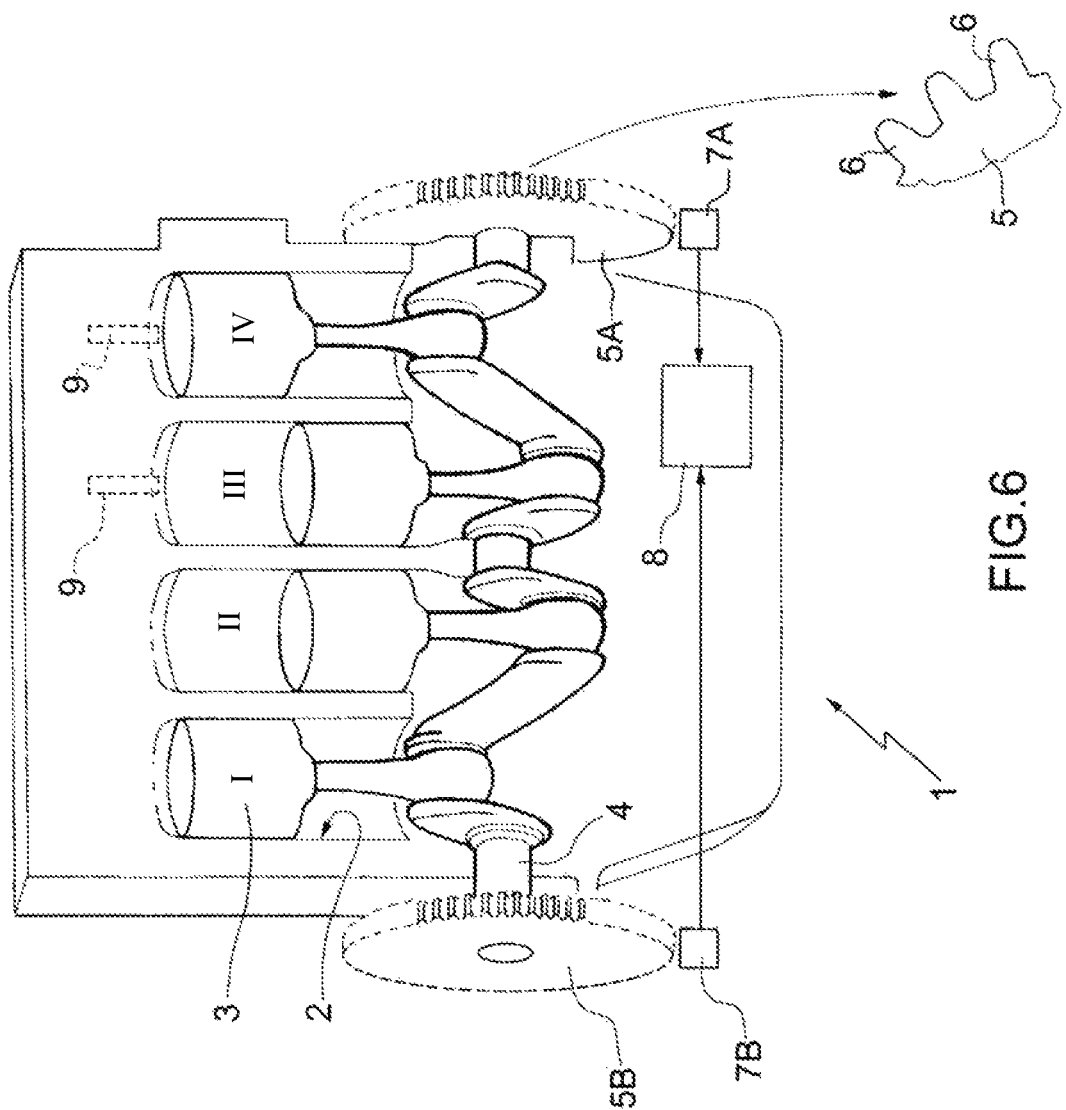
FIG. 6 is a schematic view of a second embodiment of the internal combustion engine of FIG. 1.

In particular, according to a variant shown in FIG. 6, a part of the cylinders 2 is provided with pressure sensors 15 that directly measure the pressure within the cylinders 2 for estimating the MFB50 combustion index and the actual instantaneous torque $T_{i\_real}$ relating to the cylinders 2 devoid of pressure sensors which measure the pressure directly within the remaining cylinders 2; in other words, in some cylinders 2 provided with the pressure sensors 9, the MFB50 combustion index and the actual instantaneous torque $T_{i\_real}$ are calculated by the direct measurement of the pressure within the cylinders 2, while in the other cylinders 2 devoid of the pressure sensors 9, the MFB50 combustion index and the actual instantaneous torque $T_{i\_real}$ are estimated by the method described above.

According to a variant, two phonic wheels 5A, 5B are keyed to the drive shaft 4. Each phonic wheel 5A, 5B is keyed to one end of the drive shaft 4; the phonic wheel 5A is keyed to the end of the drive shaft 4 at the timing belt and facing the cylinder indicated by I, while the phonic wheel 5B is keyed to the end of the shaft 4 at the flywheel and facing the cylinder indicated by IV. Each phonic wheel 5A, 5B is provided with a number n (for example 60) of teeth 6 (equal for the two phonic wheels 5A, 5B) and is coupled to a respective sensor 7A, 7B which is adapted to detect the time period elapsed between the passage of two consecutive teeth 6. Furthermore, the internal combustion engine 1 comprises one or two pressure sensors 9 housed within one or two cylinders 2; the pressure sensors 9 are housed within the cylinders 2 indicated by III and/or IV. It has in fact been shown experimentally that the estimation of the MFB50 combustion index obtained by the aforesaid method is less accurate for the cylinders 2 indicated by III and IV than for the cylinders 2 indicated by I and II. In fact, it is advantageous to house the pressure sensors 9 in those cylinders 2 for which the estimation method of the MFB50 combustion index and/or the actual instantaneous torque $T_{i\_real}$ is less precise or reliable.

In the case of the cylinder 2 indicated by III or IV, the method acquires the pressure value within the considered cylinder 2 through the respective pressure sensor 9 to determine the actual MFB50$_{REAL}$ combustion index and/or the actual instantaneous torque T$_{REAL}$ based on the acquired pressure value.

The actual MFB50$_{REAL}$ combustion index and/or the actual instantaneous torque T$_{REAL}$ are then compared respectively with the estimated MFB50$_{EST}$ combustion index and/or with the estimated instantaneous torque T$_{EST}$ by means of the previously described estimation method.

When the difference in absolute value between the actual instantaneous torque T$_{REAL}$ and the estimated instantaneous torque T$_{EST}$ is greater than a limit value $\Delta_K$, the control unit 8 updates the correlation coefficient K$_i$ between the estimated instantaneous torque T$_{EST}$ and the average torsion $\Delta\theta$ calculated through the formula [4] of the cylinder 2 indicated by III. In particular, the correlation coefficient K$_i$ of the cylinder 2 indicated by III is updated in such a way that the actual instantaneous torque T$_{REAL}$ and the estimated instantaneous torque T$_{EST}$ are equal to each other.

According to a preferred variant, the correction applied to the correlation coefficient K$_i$ of the cylinder 2 indicated by III is also propagated to the correlation coefficients of the remaining cylinders 2 indicated by I, II and IV. Advantageously, the correction applied to the correlation coefficient K$_i$ of the cylinder 2 indicated by III is propagated to the remaining cylinders 2 according to a linear propagation law which takes into account the distance of the cylinders 2 from the torque application point, i.e. from the flywheel.

Analogously, when the difference in absolute value between the actual MFB50$_{REAL}$ combustion index and the estimated MFB50$_{EST}$ combustion index is greater than a limit value $\Delta_P$, the control unit 8 updates the correlation coefficient P$_i$ between the estimated MFB50$_{EST}$ combustion index and the phase Arg($\Omega_1$) of the harmonic ft of the average torsion $\Delta\theta$ calculated using the formula [4] of the cylinder 2 indicated by III. In particular, the correlation coefficient P$_i$ of the cylinder 2 indicated by III is updated so that the actual MFB50$_{REAL}$ combustion index and the estimated MFB50$_{EST}$ combustion index are equal to each other.

According to a preferred variant, the correction applied to the correlation coefficient P$_i$ of the cylinder 2 indicated by III is propagated also to the correlation coefficients P$_i$ of the remaining cylinders 2 indicated by I, II and IV. Advantageously, the correction applied to the correlation coefficient P$_i$ of the cylinder 2 indicated by III is propagated to the remaining cylinders 2 according to a linear propagation law which takes into account the distance of the cylinders 2 from the torque application point, i.e. from the flywheel.

In this way, during the normal operation of the internal combustion engine 1, it is possible to update in real time both the correlation coefficient K$_i$ between the estimated instantaneous torque T$_{EST}$ and the average torsion $\Delta\theta$ and the correlation coefficient P$_i$ between the estimated combustion index MFB50$_{EST}$ and the phase Arg ($\Omega_1$) of the harmonic $\Omega_1$ of the average torsion $\Delta\theta$ to keep into account the aging of the two phonic wheels 5A, 5B and the resulting drift in the determination of the average torsion $\Delta\theta$ through the signals coming from the two phonic wheels 5A, 5B.

The aforesaid estimation method has numerous advantages, since it is efficient, i.e. it allows the estimation of the torque imbalance with considerable accuracy, it is effective, i.e. it allows both the estimation of the MFB50 combustion index and of the actual instantaneous torque T$_{i\_real}$ without employing an excessive computing power, rapid and cost-effective i.e. without requiring the installation of additional components beside those normally present in a modern internal combustion engine (such as, for example, the pressure sensors in the combustion chamber) and simply inserting a very low-cost component like a position sensor such as the phonic wheel 5.

The invention claimed is:

1. A method of estimating the MFB50 combustion index, namely the crank angle at which 50% of the fuel mass has been burnt in the cylinders of an internal combustion engine provided with a drive shaft and a pair of phonic wheels, each keyed to one respective end of the drive shaft wherein a first phonic wheel is keyed to the end of the drive shaft at a flywheel, and a second phonic wheel is keyed to the end of the drive shaft at a timing belt and wherein each phonic wheel is provided with a number of teeth and is coupled to a respective position sensor which detects the time elapsed between the passage of two consecutive teeth; the estimation method comprising the steps of:

capturing the signals coming from the at least one pair of position sensors;

determining an instantaneous relative torsion ($\Delta\theta$) of the drive shaft based on the signals coming from the at least one pair of position sensors;

conducting a frequency analysis of the instantaneous relative torsion ($\Delta\theta$) of the drive shaft to determine a first harmonic ($\Omega_1$) of the instantaneous relative torsion ($\Delta\theta$) signal by its own module ($|\Omega_1|$) and by its own phase (Arg($\Omega_1$));

estimating the MFB50 combustion index of each cylinder based on the phase (Arg($\Omega_1$)) of the first harmonic ($\Omega_1$) of the instantaneous relative torsion ($\Delta\theta$) signal and the instantaneous relative torsion ($\Delta\theta$) of the drive shaft generated during the combustion along the angular arc corresponding to a combustion phase of each cylinder;

for each cylinder, during a preliminary set-up phase, determining a first correlation coefficient (P$_i$) between the MFB50 combustion index of each cylinder and the instantaneous relative torsion ($\Delta\theta$) of the drive shaft;

wherein the first correlation coefficient (P$_i$) is expressed as follows:

$P_i = \text{MFB50}_i/\text{Arg}(\Omega_1)_i$ with $i=1 \ldots n$, where

MFB50$_i$ represents the combustion index based on the ith cylinder;

Arg ($\Omega_1$)$_1$ represents phase Arg ($\Omega_1$) of the first harmonic ($\Omega_1$) of the instantaneous torsion ($\Delta\theta$) signal;

Pi represents the first correlation coefficient between the MFB50 combustion index and the phase Arg ($\Omega_1$) of the first harmonic ($\Omega_1$) of the instantaneous relative torsion ($\Delta\theta$) signal; and n represents the number of cylinders; and once the first correlation coefficient (P$_i$) for each cylinder is determined, the first correlation coefficient (P$_i$) can be used during the normal operation of the internal combustion engine to determine a real (MFB50$_{real}$) combustion index for each cylinder;

and wherein at least one cylinder is provided with a pressure sensor housed in the combustion chamber and the method further comprises the steps of:

for each cylinder, during a preliminary set-up phase, determining a first correlation coefficient (P$_i$) between the estimated MFB50 combustion index and the instantaneous relative torsion ($\Delta\theta$) of the drive shaft;

determining an actual MFB50 combustion index of the cylinder based on the signal coming from the pressure sensor housed in the combustion chamber;

determining an estimated MFB50 combustion index of the cylinder based on the instantaneous relative torsion ($\Delta\theta$) of the drive shaft;

comparing the actual MFB50 combustion index of the cylinder with the estimated MFB50 combustion index;

correcting the first correlation coefficient ($P_i$) of the cylinder based on the comparison between the actual MFB50 combustion index and the estimated MFB50 combustion index and correcting the first correlation coefficient ($P_i$) of the remaining cylinders without pressure sensors within the pressure chambers based on the comparison between the actual MFB50 combustion index and the estimated MFB50 combustion index.

2. A method according to claim 1 and comprising the further steps of:

determining the angular speed ($\omega$) of the drive shaft based on the signals coming from the at least one pair of position sensors; and determining the instantaneous relative torsion ($\Delta\theta$) of the drive shaft based on the angular speed ($\omega$) of the drive shaft.

3. A method according to claim 2, wherein the position sensors are encoders or phonic wheel sensors; the method comprising the steps of:

associating an angular reference of a first pair of position sensors with each angular reference of a second pair of position sensors;

determining the instantaneous relative torsion ($\Delta\theta$) of the drive shaft based on the difference between the time instant in which the passage of the angular reference of the first position sensor is detected and the time instant in which the passage of the angular reference of the second position sensor is detected.

4. A method according to claim 1, wherein the step of carrying out a frequency analysis comprises applying the Fourier transform to the instantaneous relative torsion ($\Delta\theta$) of the drive shaft.

5. A method according to claim 1, wherein each cylinder is interposed between a pair of position sensors; the method comprises, for each cylinder, the steps of:

capturing the signals coming from the two position sensors adjacent to said cylinder;

determining the instantaneous relative torsion ($\Delta\theta$) of the drive shaft generated during the combustion along the angular arc corresponding to the combustion phase of said cylinder based on the signals coming from the two position sensors adjacent to said cylinder; and estimating the MFB50 combustion index of each cylinder based on the instantaneous relative torsion ($\Delta\theta$) of the drive shaft generated during the combustion along the angular arc corresponding to the combustion phase of said cylinder.

* * * * *

UNITED STATES PATENT AND TRADEMARK OFFICE
CERTIFICATE OF CORRECTION

PATENT NO. : 10,739,232 B2
APPLICATION NO. : 15/341156
DATED : August 11, 2020
INVENTOR(S) : Federico Stola et al.

Page 1 of 1

It is certified that error appears in the above-identified patent and that said Letters Patent is hereby corrected as shown below:

In the Claims

Column 10, Line 12 Claim 1 delete "at a timing belt and wherein" and insert therefor --at a timing belt; and wherein--.

Column 10, Line 43 Claim 1 delete "the instantaneous torsion ($\Delta\theta$) signal;" and insert therefor --the instantaneous relative torsion ($\Delta\theta$) signal;--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*